United States Patent [19]
Andō

[11] Patent Number: 4,665,512
[45] Date of Patent: May 12, 1987

[54] OPTICAL HEAD FOR ERASING

[75] Inventor: Hideo Andō, Tokyo, Japan

[73] Assignee: Kabushiki Kaisha Toshiba, Kawasaki, Japan

[21] Appl. No.: 655,159

[22] Filed: Sep. 27, 1984

[30] Foreign Application Priority Data

Sep. 29, 1983 [JP] Japan .................. 58-181267
Nov. 25, 1983 [JP] Japan .................. 58-221572
Nov. 25, 1983 [JP] Japan .................. 58-221573

[51] Int. Cl.⁴ .................................. G11B 7/095
[52] U.S. Cl. ............................ 369/44; 369/46; 369/112; 369/100
[58] Field of Search ............... 369/44, 45, 46, 112, 369/111, 110, 109, 100, 121, 122; 346/762; 250/201, 202

[56] References Cited

U.S. PATENT DOCUMENTS

| | | | |
|---|---|---|---|
| 3,368,209 | 2/1968 | Glauchlan | 360/59 |
| 3,736,046 | 5/1973 | Zook | 346/762 |
| 3,983,317 | 9/1976 | Glorioso | 369/112 |
| 4,079,248 | 3/1978 | Lehureau et al. | 250/201 |
| 4,115,809 | 9/1978 | Ueno | 369/109 |
| 4,123,652 | 10/1978 | Bouwhuis | 250/204 |
| 4,125,859 | 11/1978 | Oshida | 369/112 |
| 4,163,149 | 7/1979 | Sawano et al. | 250/204 |
| 4,467,462 | 8/1984 | Shibata | 369/46 |
| 4,564,931 | 1/1986 | Ohara | 369/111 |
| 4,566,088 | 1/1986 | Yoshida | 369/111 |

Primary Examiner—Alan Faber
Attorney, Agent, or Firm—Cushman, Darby & Cushman

[57] ABSTRACT

In an optical system for recording, reproducing and erasing information by converging a laser beam on an erasable recording layer on an optical disk, a laser beam having the same spot size as an aperture of an objective lens is converged by the objective lens and is projected on the recording layer in the recording/reproducing mode. In the erasing mode, a cylindrical lens is inserted in the optical path of the laser beam directed toward the objective lens to be perpendicular to a direction along which a tracking guide on the recording layer extends. Therefore, a beam spot extending along the tracking guide extension direction is formed on the recording layer, thereby erasing information.

9 Claims, 13 Drawing Figures

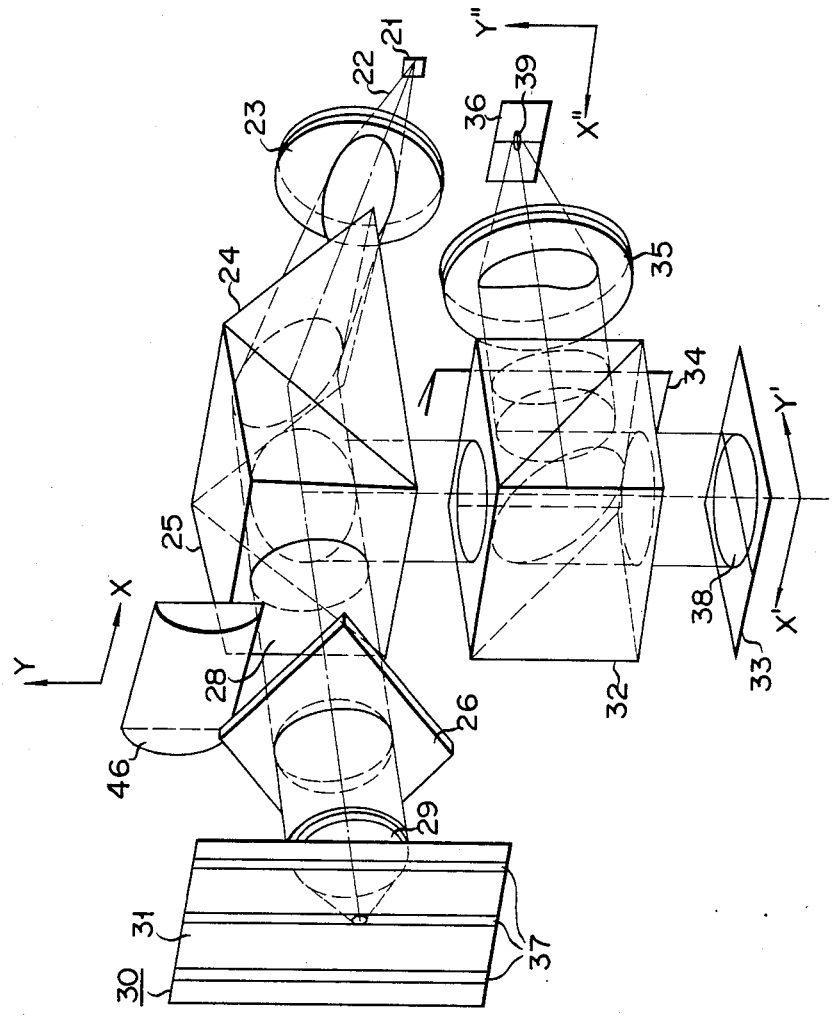

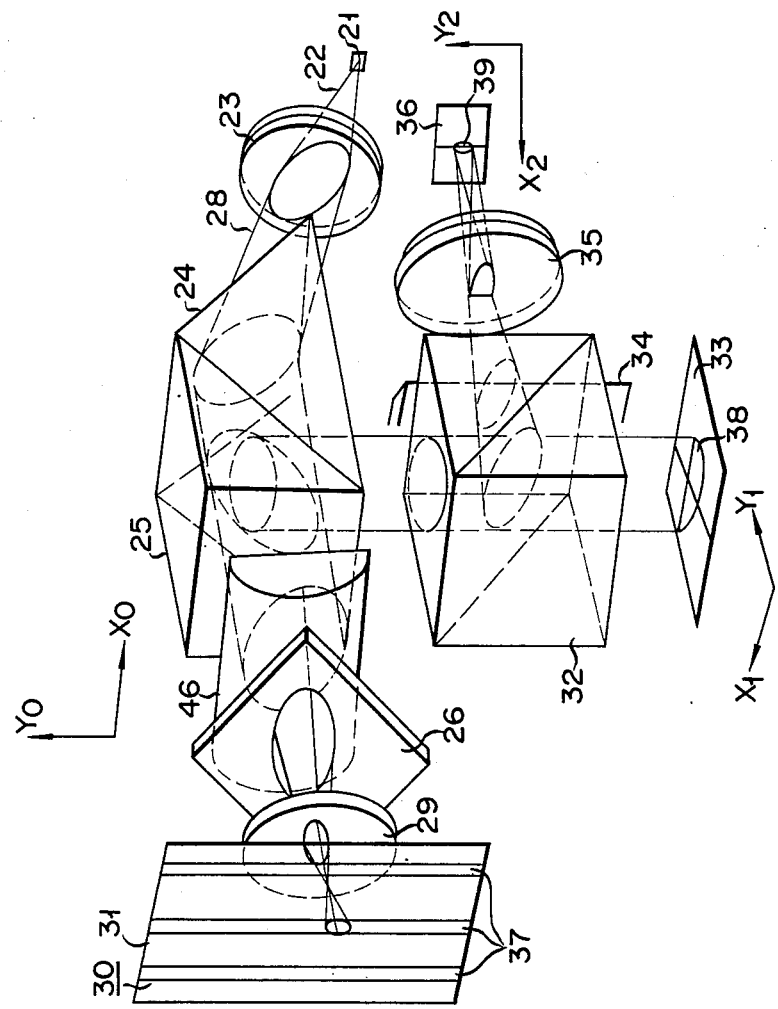

OPTICAL HEAD FOR ERASING

BACKGROUND OF THE INVENTION

The present invention relates to an optical head which is used for an optical disk which allows erasure of information and which can emit a light beam for recording, reproducing or erasing the information with respect to the optical disk.

An optical disk is recently proposed which allows erasure of information and which has an erasable recording layer of a thermoplastic material, a material which changes its optical characteristics by a photo-magnetic effect, or an amorphous alloy which changes its crystalline state to amorphous state upon being exposed to optical energy. In such an optical disk, for example, in an optical disk having an erasable recording layer of an amorphous alloy, the recording layer is heated rapidly and is rapidly cooled by a first laser beam to form an amorphous region in the recording layer to record information. The recording layer is gradually heated and is gradually cooled by a second laser beam to return the amorphous region of the recording layer into a crystalline state, thereby erasing information.

An optical disk used for an optical head having an erasable recording layer which allows erasure of information must be able to generate an erasing laser beam and a recording/reproducing laser beam from the viewpoint of characteristics of the recording layer. In view of this requirement, a conventional optical head has an optical system which has an erasing laser unit for emitting an erasing laser beam and a recording/reproducing laser unit for emitting a recording/reproducing laser beam and which can guide either the erasing laser beam or recording/reproducing laser beam to the recording layer. However, in the conventional optical head, since the optical system must be designed in view of the first and second laser beams, the optical system becomes complex, and the overall system becomes large and expensive.

SUMMARY OF THE INVENTION

It is an object of the present invention to provide an optical head which is compact and simple.

According to the present invention, there is provided an optical head, for focusing a laser beam onto an erasable recording surface having a tracking guide on which information can be recorded, comprising means for generating a light beam, an objective lens for converging the light beam toward the recording surface to record and erase information, and transferring the light beam resulted from the recording surface to an optical path, a cylindrical lens having a major axis, which can be inserted into the optical path in an erasing mode and removed from the optical path in a recording mode along a first direction substantially normal to the major axis and parallel to the tracking guide, for changing the shape of the light beam directed to the recording layer, the shape of the light beam in the recording mode being different from that in the erasing mode, and means for detecting the light beam reflected by the recording layer.

BRIEF DESCRIPTION OF THE DRAWINGS

FIGS. 6 and 7 are schematic perspective views of an optical head according to another embodiment of the present invention.

DETAILED DESCRIPTION OF THE PREFERRED EMBODIMENTS

Figure 1:
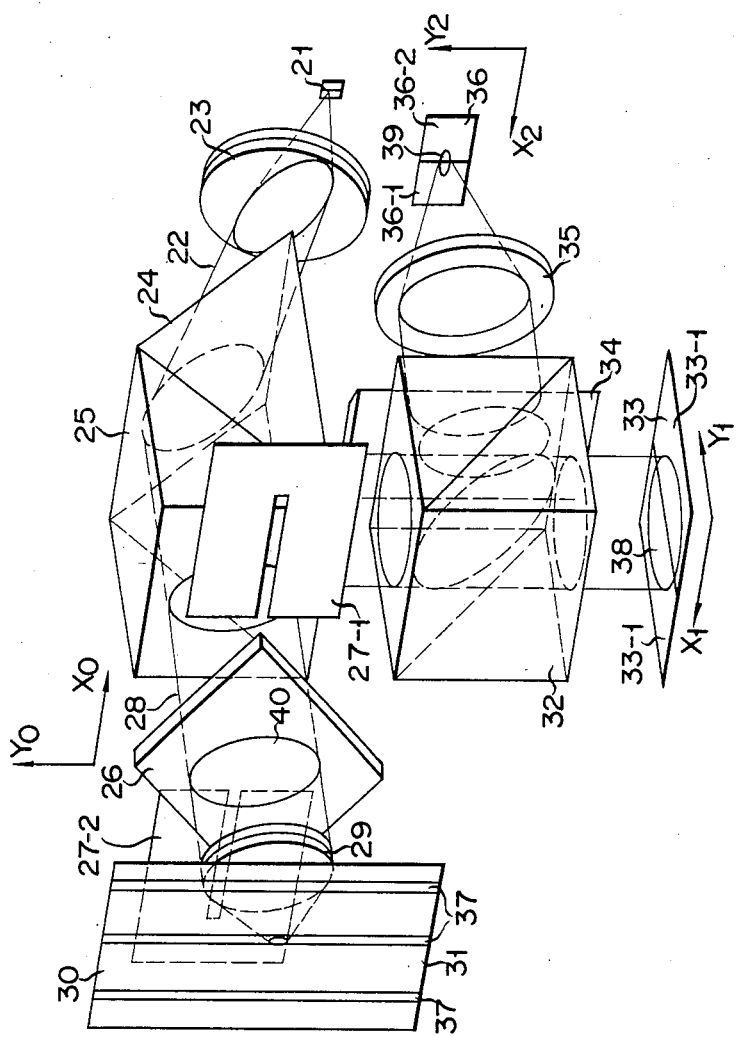
FIGS. 1 and 2 are schematic perspective views of an optical head according to an embodiment of the present invention.
Figure 2:
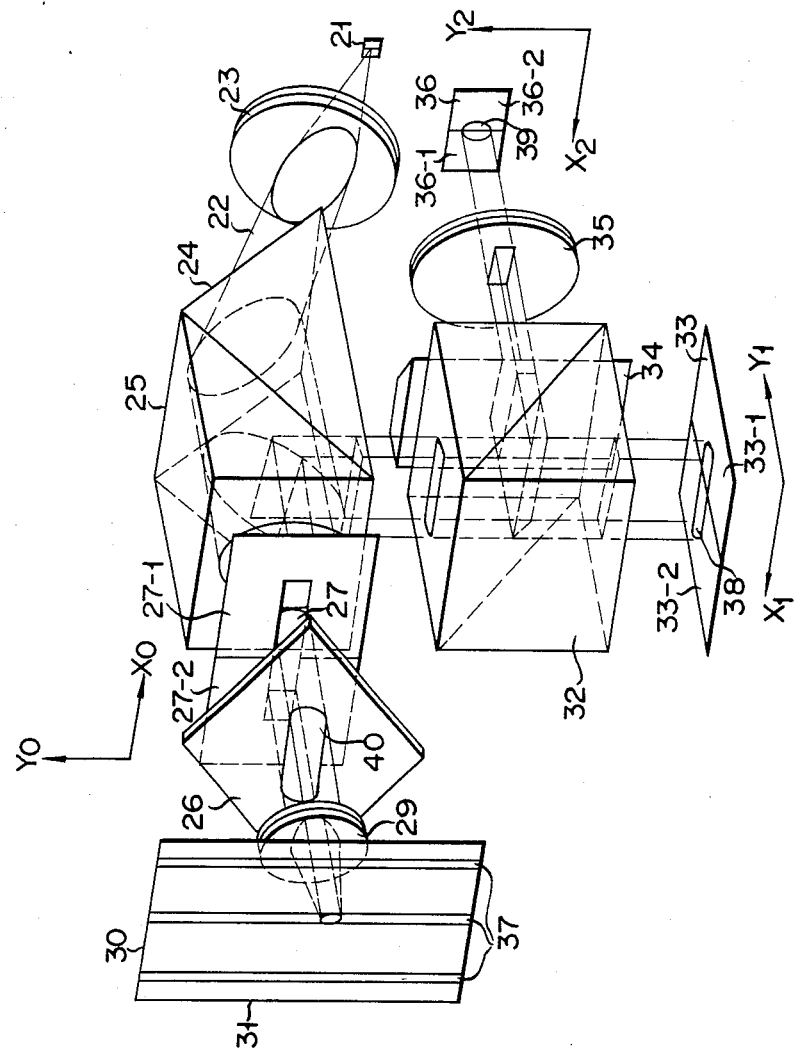

FIGS. 1 and 2 illustrate an optical head according to one embodiment of the present invention. In the optical head shown in FIGS. 1 and 2, a laser beam 22 emitted from a semiconductor laser 21 is collimated into a parallel laser beam by a collimator lens 23. The collimated laser beam becomes incident on one inclined surface of a prism 24. The prism 24 corrects the incident laser beam having an elliptical section into a laser beam having a circular section with a uniform light intensity distribution. The laser beam emerging from the prism 24 is further passed through a polarization beam splitter 25 and a quarter wave plate 26 to be converted into a circular polarized laser beam.

When information is recorded or reproduced, a laser beam 28 emerging from the beam splitter 25 can propagate straight without any interference and becomes incident on an objective lens 29. The laser beam is converged by the objective lens 29 and is directed toward a light reflecting layer or recording layer 31 on an optical disk 30. The parallel laser beam incident on the objective lens 29 has a spot diameter which is substantially equal to or more than the aperture of the objective lens 29. Therefore, the laser beam converged by the objective lens 29 in the just in-focusing state forms a sufficiently small laser beam spot on the light reflecting layer 31 of the optical disk 30. During recording, the semiconductor laser 21 generates a laser beam which is intensity-modulated by a maximum output, e.g., 5 to 10 W in accordance with write information. That region of the light reflecting layer 31 of the optical disk 30 which is irradiated with the laser beam of maximum intensity is rapidly heated and cooled and is changed from the crystalline state to the amorphous state. That region of the light reflecting layer 31 of the optical disk 30 which is irradiated with the laser beam of minimum intensity is rapidly heated but is not rapidly cooled to be kept in the crystalline state. As a result, crystalline and amorphous regions are alternately formed to record information on the recording layer 31. During reproduction, the semiconductor laser 21 generates a laser beam of a constant output, e.g., 1 to 2 W. Then, a sufficiently small circular laser beam spot is formed on the recording layer 31 on which crystalline and amorphous regions are alternately formed. Then, the laser beam is intensity-modulated by the alternate crystalline and amorphous regions.

The recording or reproducing laser beam is reflected by the light reflecting layer 31. The reflected laser beam is passed through the objective lens 29 and the quarter wave plate 26 again to become incident on the polarization beam splitter 25. When the laser beam is passed through the quarter wave plate 26, its plane of vibration is rotated through 90 degrees and is linearly polarized. Therefore, the laser beam is reflected by the polarization beam splitter 25 and is guided to a detection system consisting of a half prism 32, a first photo detecting unit 33, a light shielding plate 34, a projection lens 35, and a second photo detecting unit 36. In this detection system, the laser beam is splitted into first and second laser beams by the half prism 32. The first laser beam is irradiated onto the first photo detecting unit 33 for detecting a tracking guide and for reading out information. The second laser beam is passed through a light shielding plate 34 such as a knife edge and the projection lens 35 and is irradiated onto the second photo detecting unit 36 for detecting defocusing.

Referring to FIG. 1, an X0-Y0 coordinate plane is parallel to the light reflecting layer 31 and is determined such that the Y0-axis is parallel to a tracking guide 37 and the X0-axis is perpendicular to the Y0-axis. Photo sensitive regions 33-1 and 33-2 of the first photo detecting unit 33 are arranged next to each other along the X1-axis in an X1-Y1 plane which is obtained by translating the X0-Y0 plane through the optical system between the light reflecting layer 31 and the first photo detecting unit 33. Photo sensitive regions 36-1 and 36-2 of the second photo detecting unit 36 are arranged next to each other along the X2-axis in an X2-Y2 plane which is obtained by translating the X0-Y0 plane through the optical system between the light reflecting layer 31 and the second photo detecting unit 36.

The second photo detecting unit 36 is substantially located on an image forming plane of a minimum beam spot formed on the light reflecting layer 31. The minimum beam spot which corresponds to the beam waist of the laser beam projected from the objective lens 29 is formed on the light reflecting layer 31, when the objective lens 29 is in the just in-focusing state. The image forming plane is determined by the optical system between the light reflecting layer 31 and the photo detecting unit 36.

When information is erased from the light reflecting layer 31 of the optical disk 30, slit plates 27-1 and 27-2 having notches extending from opposite sides are moved at the same speed along the $+X0$ and $-X0$ directions and are inserted in the optical path between the polarization beam splitter 25 and the quarter wave plate 26. Therefore, a slit 27 extending in the X0 direction is arranged in the optical path of the laser beam as shown in FIG. 3. After the slit 27 is arranged in the optical path, the semiconductor laser 21 is energized at a constant maximum output. The laser beam passed through the slit 27 is thereby shaped into a beam which is elongated along the X0 direction. Therefore, when the slit 27 is arranged in the optical path, a laser beam spot 40 is formed into a rectangle having long sides along the X axis and short sides along the Y axis, as shown in FIG. 2, in a far field plane with respect to the light reflecting layer 31 of the optical disk 30 between the objective lens 29 and the polarization beam splitter 25. Therefore, when the laser beam passed through the slit 27 is converged by the objective lens 29, an elliptical beam spot is formed on the light reflecting layer 31 of the optical disk 30 to have a major axis along the Y axis and a minor axis along the X axis. As a result, the light reflecting layer 31 of the optical disk 30 is gradually heated and gradually cooled by the elliptical beam spot. The region of the layer 31 which is irradiated with the beam spot is returned to the crystalline state.

When the slit 27 is inserted in the optical path, shape of a spot 38 on the first photo detecting unit 33 is also changed. However, as has been described above, the laser beam spot 40 on the far field plane is shortened only in the direction parallel to the tracking guide 37, i.e., the Y-axis. Therefore, the beam spot on the first photo detecting unit 33 is changed only in its size along the Y1 direction and is not changed in size along the X1 direction. In a tracking guide detection system, the tracking guide is traced by the laser beam in accordance with the difference between photo currents from the photo sensitive regions 33-1 and 33-2 arranged next to each other along the X1-direction. Therefore, the change in size of the spot on the first photo detecting unit 33 does not affect the tracking guide detection system. Correct tracking guide tracing can thus be performed in the recording/reproducing mode or erasing mode.

Similarly, when the slit 27 is inserted in the optical path, even if the objective lens 29 is in the just in-focusing state, the shape of a spot 39 on the second photo detecting unit 36 is also changed. However, as has been described above, the laser beam spot 40 in the far field plane is shortened only in the direction parallel to the tracking guide 37, i.e., the Y-axis. Therefore, the beam spot formed on the second photo detecting unit 36 is changed in size only in the Y2 direction and is not changed in size in the X2 direction. A defocusing state detection system generates a defocusing signal in accordance with the difference between photo currents from the photo sensitive regions 36-1 and 36-2 arranged next to each other along the X2 direction and keeps the objective lens 29 in the just in-focusing state. Therefore, a change in the beam spot formed on the second photo detecting unit 36 does not affect the defocusing state detection system. The objective lens 29 can be constantly kept in the just in-focusing state in either the recording/reproducing mode or erasing mode.

In the defocusing state detection system shown in FIGS. 1 and 2, while the objective lens 29 is in the just in-focusing state, a minimum beam spot is formed on the light reflecting layer 31. The image of the spot is formed between the photo sensitive regions 36-1 and 36-2 of the second photo detecting unit 36. Therefore, substantially the same photo current is generated from the photo sensitive regions 36-1 and 36-2. When the objective lens 29 is then defocused, the spot on the light reflecting layer 31 is increased in size. The laser beam directed from the objective lens 29 toward the projection lens 35 is diverged or converged. Since the laser beam is partially shielded by the light shielding plate 34, the remaining laser beam is directed toward one of the photo sensitive regions 36-1 and 36-2 of the second photo detecting unit 36. Then, the photo currents from the photo sensitive regions 36-1 and 36-2 become different from each other by a degree corresponding to the defocusing degree. The objective lens 29 is moved in accordance with such a difference between photo currents, so that the objective lens 29 is kept in the just in-focusing state.

The defocusing state detection system is not limited to a system using the light shielding plate 34 such as a knife edge as shown in FIGS. 1 and 2. Therefore, the defocusing state detection system can be any system which can generate a defocusing signal in accordance with the difference between photo currents from the photo sensitive regions 36-1 and 36-2 and which can keep the objective lens 29 in the just in-focusing state. The photo detecting unit 36 need have at least two photo sensitive regions and can be, for example, a system using a single photo detecting unit with four photo sensitive regions for detecting a tracking guide or defocusing.

The laser beam passed through the slit 27 is increased in size by diffraction as it is separated further from the slit. Therefore, the slit 27 is preferably arranged near the objective lens 29. In the embodiment shown in FIGS. 1 and 2, the slit is interposed between the polarization beam splitter 25 and the quarter wave plate 26. However, the slit can be interposed between the objective lens 29 and the quarter wave plate 26.

According to the present invention, when the slit 27 is arranged in the optical path, the laser beam reaching the light reflecting layer 31 is reduced in size. However, in this case, the rotation rate of the optical disk 30 may be decreased to irradiate a laser beam for a time interval necessary to erase information or the power of the semiconductor laser 21 may be increased to correct the decrease of the laser beam in the slit 27. Thus, the recording layer 31 is gradually heated and gradually cooled. In a conventional optical head, the erasing laser beam spot has a size 10 times that of the recording laser beam spot. However, in the optical head according to the embodiment of the present invention, the erasing laser beam spot has a size 2 to 4 times that of the recording laser beam spot. In addition, the optical disk 30 is rotated at a relatively low speed in order to prolong the irradiation time of the erasing laser beam. Therefore, in the conventinal optical head, a single irradiation operation of the beam spot erases about 10 bit information. However, according to the optical head of the present invention, 1 to 3 bit information can be erased and only desired information can be erased.

Figure 3A:
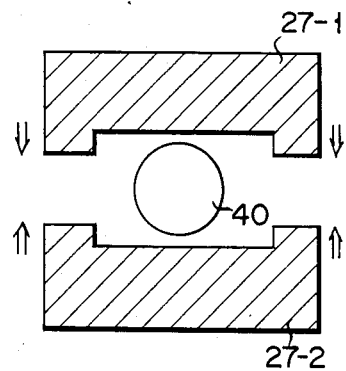
FIGS. 3A and 3B, FIGS. 4A and 4B, and FIGS. 5A and 5B are plan views showing slit assemblies according to modifications of the slit shown in FIG. 1.
Figure 3B:
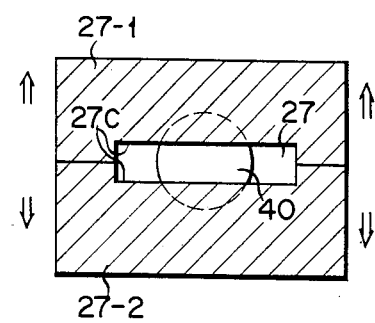
Figure 4A:
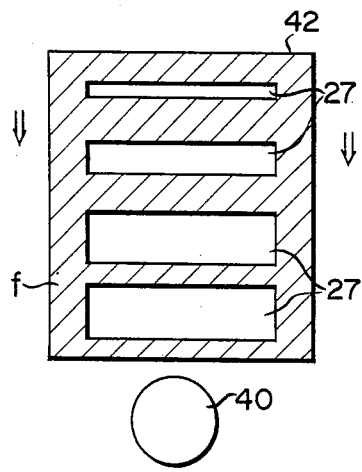
Figure 4B:
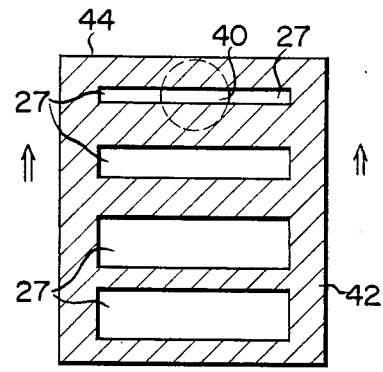
Figure 5A:
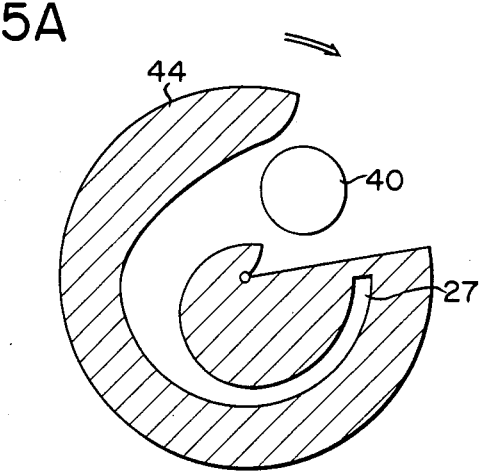
Figure 5B:
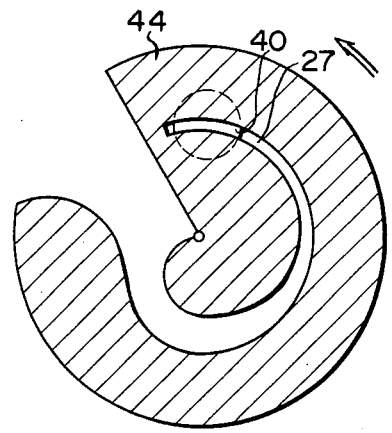

When the beam spots 38 and 39 which are formed symmetrically on the first and second photo detecting units 33 and 36 with respect to a symmetry axis parallel to the Y1 and Y2 axes is changed into a nonsymmetrical shape in a switching operation from the recording/reproducing mode to the erasing mode, that is, upon insertion of the slit plates 27-1 and 27-2, a just in-focusing state can be erroneously detected as a defocusing state or a laser beam correctly tracing a tracking guide can be detected as erroneously tracing it. In order to prevent this, the slit plates 27-1 and 27-2 are inserted in the optical path so that the laser beam will pass symmetrically with respect to the symmetry axis parallel to the Y-axis. A mechanism for allowing the laser beam symmetrically with respect to a symmetry axis parallel to the Y-axis may be a plate as shown in FIGS. 3A and 3B, 4A and 4B, and 5A and 5B. As shown in FIGS. 3A and 3B, the slit plates 27-1 and 27-2 can be moved along the Y axis. In this case, in the recording/reproducing mode, the laser beam path is secured as shown in FIG. 3A. In the erasing mode, the slit plates 27-1 and 27-2 are moved along the Y axis to come close to each other and the laser beam is shaped. Alternatively, as shown in FIGS. 4A and 4B, a slit plate 42 can be adopted which has slits 27 which are short along the Y axis. When this plate 42 is moved along the Y axis and is inserted into the optical path as shown in FIG. 4A or when the plate 42 is moved along the Y axis to be removed from the optical path as shown in FIG. 4B, the size of the passing laser beam is gradually narrowed along the Y axis while it is symmetrical with respect to a symmetry axis parallel to the Y axis, thereby shaping the beam. A slit plate 44 as shown in FIGS. 5A and 5B can also be used. This plate 44 has a spiral slit which has a width narrowed toward the center. When the recording/reproducing mode is changed to the erasing mode, the plate 44 is rotated. As the plate 44 is rotated, the laser beam is decreased in width along the Y-axis while it is kept symmetrical with respect to the symmetry axis parallel to the Y axis. Thus, the beam is shaped.

In the embodiment described above, the slit which is mechanically inserted into or removed from the optical path is used for shaping the beam. However, it is not limited to use the slit but another optical device for shaping the beam may be used. For example, an optical device incorporated with liquid crystal, Faraday cell, or electrooptic element is located in the optical path and the optical characteristics of the optical device is changed to shape the laser beam. That is, the central region of the optical device is transparent in the recording reproducing and the erasing modes but the peripheral region of the optical device is switched from the transparent state to the nontransparent state when the recording or reproducing mode is changed into the erasing mode.

Further embodiments of the present invention will now be described with reference to FIGS. 6 to 10. In the optical head as shown in FIGS. 6 and 7, a cylindrical lens 46 is used in place of the slit. In the recording-/reproducing mode, the cylindrical lens 46 is removed from the optical path between a polarization beam splitter 25 and a quarter wave plate 26 as shown in FIG. 6. However, in the erasing mode, as shown in FIG. 7, the cylindrical lens 46 is inserted into the optical axis along the Y axis so that its longitudinal axis, i.e., the base line is parallel to the X axis and the optical axis and the base line are parallel to each other. Therefore, the laser beam passed through the cylindrical lens 46 is converged between an objective lens 29 and a light reflecting layer 31 and is irradiated onto the light reflecting layer 31 when the objective lens 29 is in the just in-focusing state. As a result, an elliptical beam spot is formed on the light reflecting layer 31. This beam spot has a major axis along the Y-axis along which a tracking guide 37 extends, and a minor axis along the X-axis. The light reflecting layer 31 of the optical disk 30 is gradually heated and gradually cooled by the elliptical beam spot. A region of the recording layer 31 which is thus irradiated with the laser beam is returned to the crystalline state.

In an optical head using such a cylindrical lens 46, a beam spot formed on a first photo detecting unit 33 formed in a similar manner as in an optical head using a slit 27 is changed in size only along the Y1 direction and is not changed in size along the X1 direction. Therefore, since in a tracking guide detection system, the tracking guide is traced by the laser beam in accordance with the difference between photo currents from photosensitive regions arranged next to each other along the X1 direction, the size change in the spot does not influence the tracking guide detection system. In this manner, correct tracing of the tracking guide can be achieved in either the recording/reproducing mode or the erasing mode. Similarly, when the cylindrical lens 46 is inserted in the optical path, even if the objective lens 29 is kept in the just in-focusing state, a spot 39 formed on a second photo detecting unit 36 is also changed. However, the beam spot formed on the second photo detecting unit 33 is changed in size only in the Y2 direction and is not changed in size in the X2 direction. Since the defocusing state detection system generates a defocusing signal according to a difference between the photo currents between the photo sensitive regions 36-1 and 36-2 arranged next to each other along the X2 direction and keeps an objective lens 29 in the just in-focusing state, the change in spot size does not adversely affect the defocusing state detection system. The objective lens 29 can be maintained in the just in-focusing state either in the recording/reproducing mode or the erasing mode.

Figure 8:
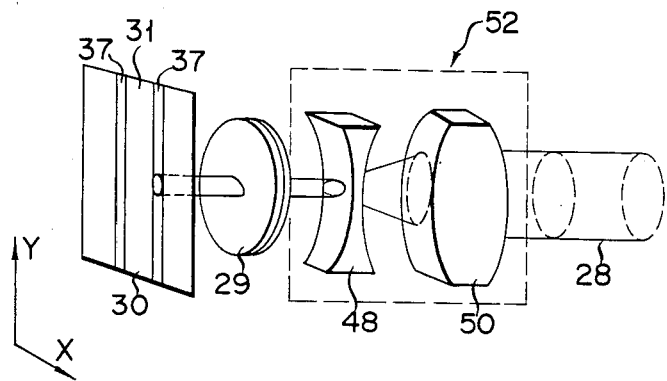
FIGS. 8, 9 and 10 are schematic perspective views showing modifications of the optical head shown in FIGS. 6 and 7.

In an optical head shown in FIG. 8, a compound lens comprising a combination of convex and concave cylindrical lenses 48 and 50 is used in place of the cylindrical lens 46. In the erasing mode, these cylindrial lenses 48 and 50 are inserted along the Y axis in the optical path between a polarization beam splitter 25 and a quarter wave plate 26 such that the longitudinal axes thereof or base lines thereof are parallel to the X-axis and that the optical axis and the base lines are perpendicular to each other, as shown in FIG. 8. The laser beam emerging from the convex and concave cylindrical lenses 50 and 48 propagates straight within a plane including the optical axis and the X-axis and is converged or diverged in a plane including the optical axis and the Y axis. Thus, the laser beam is converted into a flat laser beam extending along the Y axis. The laser beam is converged by the objective lens 29 and is irradiated onto a light reflecting layer 31. As a result, an elliptical beam spot is formed on the light reflecting layer 31 and has a major axis extending along the Y axis along which a tracking guide 37 extends and a minor axis extending along the X-axis. The light reflecting layer 31 of the optical disk 30 is gradually heated and gradually cooled by the elliptical beam spot. A region of the layer 31 which is irradiated with the laser beam is returned to the crystalline state.

In the optical head using the compound lens 52 as described above, as in the same manner in an optical head using the cylindrical lens 46, the beam spot formed on the first photo detecting unit 33 is changed in size only in the Y1 direction and is not changed in size in the X1 direction. Since in a tracking guide detection system, the tracking guide is traced by the laser beam in accordance with the difference between photo currents from photo sensitive regions 33-1 and 33-2 arranged next to each other along the X1 direction, the size change in the beam does not adversely affect this tracking guide detection system. Therefore, correct tracing of the tracking guide can be achieved in either the recording/reproducing mode or the erasing mode. Similarly, when the cylindrical lens 46 is inserted in the optical path, even if the objective lens 26 is inserted in the just in-focusing state, the shape of a spot 39 formed on a second photo detecting unit 36 is also changed. However, the beam spot formed on a second photo detecting unit 36 is changed in size only in the Y2 direction and is not changed in size in the X2 direction. Since a defocusing state detection system generates a defocusing signal in accordance with the difference between the photo currents from photo sensitive regions 36-1 and 36-2 arranged next to each other along the X2 direction and keeps an objective lens 29 in the just in-focusing state, the size change of the beam does not adversely affect the defocusing state detection system. The objective lens 29 can be maintained in the just in-focusing state in either the recording/reproducing mode or in the erasing mode.

Figure 10:
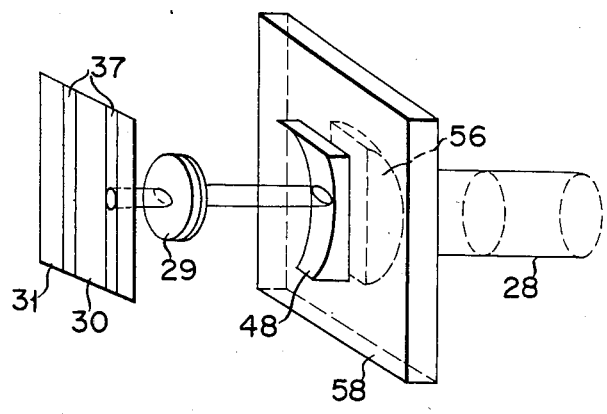
Figure 9:
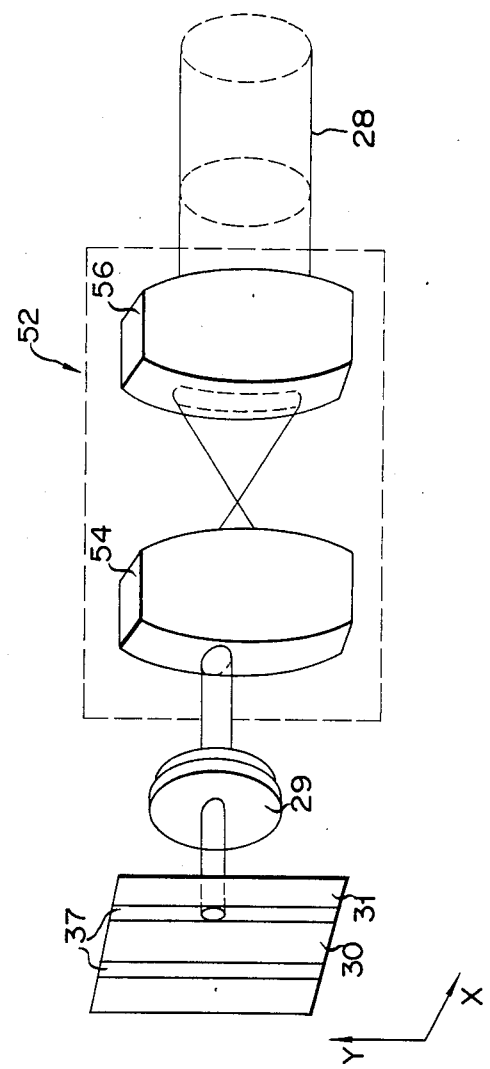

The compound lens 52 is not limited to a combination of convex and concave lenses 48 and 50 but can be a combination of convex lenses 54 and 56, as shown in FIG. 9. Furthermore in order to integrally move the lens 52, concave and convex cylindrical lenses 48 and 50 can be adhered on a glass plate 58 as shown in FIG. 10. In order to reduce the thickness of the glass plate 58 in the lens assembly shown in FIG. 10, the laser beam must be significantly converged. For this purpose, a convex cylindrical lens 50 having a short focal length must be used. Then, the convex lens 50 becomes large in size. In this case, a Fresnel lens can be used in place of a glass lens. In other words, a lens assembly may be adopted wherein the two surfaces of a plate plate have the Fresnel lens structure.

What is claimed is:

1. An optical head for focusing a laser beam onto an erasable recording surface having a tracking guide on which information can be recorded, comprising:
   means for generating a light beam;
   an objective lens for converging the light beam toward the recording surface to record and erase information and transferring the light beam resulting from the recording surface to an optical path;
   cylindrical lens means, having a major axis, which can be inserted into the optical path in an erasing mode and removed from the optical path in a recording mode along a first direction substantially normal to the major axis and parallel to the tracking guide, for changing the shape of the light beam directed to the recording layer, the shape of the light beam in the recording mode being different from that in the erasing mode; and
   means for detecting the light beam deflected by the recording layer.

2. An optical head according to claim 1, wherein the means for detecting the light beam includes a photo detecting unit with at least one pair of photo sensitive regions.

3. An optical head aaccording to claim 2, wherein the recording layer has a tracking guide, and said at least one pair of photo sensitive regions are arranged in a direction perpendicular to a direction along which a tracking guide image extends when the tracking guide is focused on the photo detecting unit.

4. An optical head according to claim 1, wherein the means for changing the shape of the light beam includes convex and concave cylindrical lenses having major axes.

5. An optical head according to claim 4, wherein the recording layer has a tracking guide, and the cylindrical lens is inserted in the optical path in such a manner that the major axis is perpendicular to a direction along which the tracking guide extends.

6. An optical head according to claim 1, wherein the means for changing the shape of the light beam includes convex cylindrical lenses having a major axis.

7. An optical head according to claim 6, wherein the recording layer has a tracking guide, and the cylindrical lens is inserted in the optical path in such a manner that the major axis is perpendicular to a direction along which the tracking guide extends.

8. An optical head according to claim 1, wherein the means for detecting the light beam includes a photo detecting unit having at least one pair of photo sensitive regions, the photo detecting unit being arranged to detect a focusing state of the objective lens.

9. An optical head according to claim 8, wherein the recording layer has a tracking guide, and the means for detecting the light beam includes a photo detecting unit having a pair of photo sensitive regions, the photo detecting unit being arranged to detect whether or not the laser beam traces the tracking guide.

* * * * *